US009671526B2

(12) United States Patent
Kumar

(10) Patent No.: US 9,671,526 B2
(45) Date of Patent: Jun. 6, 2017

(54) OCCUPANCY SENSOR WITH IMPROVED FUNCTIONALITY

(71) Applicant: Crestron Electronics, Inc., Rockleigh, NJ (US)

(72) Inventor: Russikesh Kumar, Ridgewood, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 478 days.

(21) Appl. No.: 14/311,580

(22) Filed: Jun. 23, 2014

(65) Prior Publication Data

US 2014/0379305 A1 Dec. 25, 2014

Related U.S. Application Data

(60) Provisional application No. 61/837,922, filed on Jun. 21, 2013.

(51) Int. Cl.
*H05B 37/02* (2006.01)
*G01V 11/00* (2006.01)

(52) U.S. Cl.
CPC ......... *G01V 11/00* (2013.01); *H05B 37/0218* (2013.01); *H05B 37/0227* (2013.01);
(Continued)

(58) Field of Classification Search
CPC ................................................ H05B 37/0227
(Continued)

(56) References Cited

U.S. PATENT DOCUMENTS 5,189,393 A 2/1993 Hu
5,216,333 A 6/1993 Nuckolls
(Continued)

OTHER PUBLICATIONS

InHome Wireless Motion Sensor Installation Guide, installation guide, 2007, Card Access, Inc.

*Primary Examiner* — Bryan Bui
(74) *Attorney, Agent, or Firm* — Crestron Electronics, Inc.

(57) ABSTRACT

An occupancy sensor detects the occupancy state of a monitored area. The occupancy sensor may be mounted in a standard junction box at various angles and one or more of the ultrasonic sensors may be disabled. The occupancy sensor includes a PIR sensor and one or more ultrasonic sensors. The sensor sensitivities and timeout settings may be programmed by a technician or user via an IR interface or via a network interface. The settings may be changed according to control system logic or some other factor such as date, time or room conditions. Setup of the sensor may also be performed via the IR interface or network interface. The occupancy outputs both a signal taking into account the timeout period as well as a raw data signal. The IR interface may be used to relay messages between a control system and external devices. Algorithms employed in the occupancy sensor allow for the occupancy sensor to process analog signals from sensors to determine the room state, enhance performance such as by reducing false trips, enhance energy savings and force sensors into vacancy or occupancy mode. The occupancy sensor additionally comprises a microphone. Sound can be required to qualify detection from another sensor and may be employed to prolong the occupancy state once it is established.

35 Claims, 14 Drawing Sheets

(52) U.S. Cl.
CPC ..... *H05B 37/0236* (2013.01); *H05B 37/0245* (2013.01); *Y02B 20/40* (2013.01); *Y02B 20/46* (2013.01)

(58) Field of Classification Search
USPC .......................................................... 702/190
See application file for complete search history.

(56) References Cited

U.S. PATENT DOCUMENTS

| | | |
|---|---|---|
| 5,406,173 A | 4/1995 | Mix |
| 5,455,487 A | 10/1995 | Mix |
| 5,598,042 A | 1/1997 | Mix |
| 5,623,172 A | 4/1997 | Zaretsky |
| 5,637,964 A | 6/1997 | Hakkarainen |
| 5,640,143 A | 6/1997 | Myron et al. |
| 5,699,243 A | 12/1997 | Eckel |
| 5,726,900 A | 3/1998 | Walter |
| 5,739,753 A | 4/1998 | Porter |
| 5,764,146 A | 6/1998 | Baldwin |
| 5,772,326 A | 6/1998 | Batko |
| 5,774,322 A | 6/1998 | Walter |
| 5,786,644 A | 7/1998 | Zaretsky |
| 5,821,642 A | 10/1998 | Nishhira |
| 5,848,054 A | 12/1998 | Mosebrook |
| 5,905,442 A | 5/1999 | Mosebrook |
| 5,927,844 A | 7/1999 | Justiniano |
| 5,946,209 A | 8/1999 | Eckel |
| 5,971,597 A | 10/1999 | Baldwin |
| 5,973,594 A | 10/1999 | Baldwin |
| 5,984,513 A | 11/1999 | Baldwin |
| 5,986,357 A | 11/1999 | Myron |
| 6,082,894 A | 7/2000 | Batko |
| 6,114,816 A | 9/2000 | Nuckolls |
| 6,126,296 A | 10/2000 | Justiniano |
| 6,138,241 A | 10/2000 | Eckel |
| 6,151,529 A | 11/2000 | Batko |
| 6,166,640 A | 12/2000 | Nishihira |
| 6,275,163 B1 | 8/2001 | Bogorad |
| 6,285,912 B1 | 9/2001 | Ellison |
| 6,289,404 B1 | 9/2001 | Bonasia |
| 6,307,331 B1 | 10/2001 | Bonasia |
| 6,307,354 B1 | 10/2001 | Nishihira |
| 6,324,008 B1 | 11/2001 | Baldwin |
| 6,348,686 B1 | 2/2002 | Howard |
| 6,385,732 B1 | 5/2002 | Eckel |
| 6,388,399 B1 | 5/2002 | Eckel |
| 6,466,826 B1 | 10/2002 | Nishihira |
| 6,472,853 B2 | 10/2002 | Nishihira |
| 6,479,823 B1 | 11/2002 | Strang |
| 6,617,560 B2 | 9/2003 | Forke |
| 6,697,757 B2 | 2/2004 | Eckel |
| 6,759,954 B1 | 7/2004 | Myron |
| 6,791,458 B2 | 9/2004 | Baldwin |
| 6,798,341 B1 | 9/2004 | Eckel |
| 6,803,728 B2 | 10/2004 | Balasubramaniam |
| 6,885,300 B1 | 4/2005 | Johnston |
| 6,888,323 B1 | 5/2005 | Null |
| 6,909,668 B2 | 6/2005 | Baldwin |
| 6,930,260 B2 | 8/2005 | Clegg |
| 6,933,486 B2 | 8/2005 | Pitigoi-Aron |
| 6,940,230 B2 | 9/2005 | Myron |
| 7,006,792 B2 | 2/2006 | Wilson |
| 7,027,355 B2 | 4/2006 | Baldwin |
| 7,027,770 B2 | 4/2006 | Judd |
| 7,092,772 B2 | 8/2006 | Murray |
| 7,106,261 B2 | 9/2006 | Nagel |
| 7,116,056 B2 | 10/2006 | Jacoby |
| 7,122,976 B1 | 10/2006 | Null |
| 7,126,291 B2 | 10/2006 | Kruse |
| 7,164,110 B2 | 1/2007 | Pitigoi-Aron |
| 7,190,126 B1 | 3/2007 | Paton |
| 7,211,798 B2 | 5/2007 | Wu |
| 7,274,117 B1 | 9/2007 | Viola |
| 7,277,012 B2 | 10/2007 | Johnston |
| 7,307,542 B1 | 12/2007 | Chandler |
| 7,358,927 B2 | 4/2008 | Luebke |
| 7,361,853 B2 | 4/2008 | Clegg |
| 7,362,285 B2 | 4/2008 | Webb |
| 7,369,060 B2 | 5/2008 | Veskovic |
| 7,391,297 B2 | 6/2008 | Cash |
| 7,394,451 B1 | 7/2008 | Patten |
| 7,405,524 B2 | 7/2008 | Null |
| 7,408,525 B2 | 8/2008 | Webb |
| 7,414,210 B2 | 8/2008 | Clegg |
| 7,432,690 B2 | 10/2008 | Williams |
| 7,436,132 B1 | 10/2008 | Null |
| 7,480,208 B2 | 1/2009 | Bender |
| 7,480,534 B2 | 1/2009 | Bray |
| 7,560,696 B2 | 7/2009 | Wu |
| 7,626,339 B2 | 12/2009 | Paton |
| 7,641,491 B2 | 1/2010 | Altonen |
| 7,747,357 B2 | 6/2010 | Murdoch |
| 7,791,282 B2 | 9/2010 | Yu |
| 7,800,049 B2 | 9/2010 | Bandringa |
| 7,800,498 B2 | 9/2010 | Leonard |
| 7,830,133 B2 | 11/2010 | Williams |
| 8,514,075 B1 * | 8/2013 | Steiner ............... G08B 13/1627 340/539.1 |
| 2005/0030162 A1 | 2/2005 | Stambaugh |
| 2008/0083234 A1 | 4/2008 | Krebs |
| 2008/0088435 A1 | 4/2008 | Cash |
| 2008/0224835 A1 | 9/2008 | Noest |
| 2008/0273754 A1 | 11/2008 | Hick |
| 2009/0095889 A1 | 4/2009 | Bender |
| 2009/0174552 A1 | 7/2009 | Soccoli |
| 2009/0265280 A1 | 10/2009 | Taneja |
| 2009/0273286 A1 | 11/2009 | Veskovic |
| 2009/0273296 A1 | 11/2009 | Veskovic |
| 2010/0005257 A1 | 1/2010 | Tamura et al. |
| 2010/0052576 A1 | 3/2010 | Steiner |
| 2010/0052894 A1 | 3/2010 | Steiner |
| 2010/0097226 A1 | 4/2010 | Parsons |
| 2010/0102962 A1 | 4/2010 | Hick |
| 2010/0188009 A1 | 7/2010 | Bull |
| 2010/0207759 A1 | 8/2010 | Sloan |
| 2010/0237711 A1 | 9/2010 | Parsons |
| 2010/0244709 A1 | 9/2010 | Steiner |
| 2010/0250547 A1 | 9/2010 | Grefenstette |
| 2010/0270982 A1 | 10/2010 | Hausman |
| 2010/0277306 A1 | 11/2010 | Leinen |
| 2010/0294915 A1 | 11/2010 | Williams |
| 2011/0307112 A1 | 12/2011 | Barrilleaux |
| 2014/0354995 A1 | 12/2014 | Huizenga et al. |

* cited by examiner

OCCUPANCY SENSOR WITH IMPROVED FUNCTIONALITY

BACKGROUND OF THE INVENTION

Technical Field

The present invention relates to building automation and more specifically to occupancy sensors.

Background Art

Efficient and productive use of space and resources is an increasingly important goal for businesses and organizations. Given current concerns about energy costs and public perception, this trend should continue for the foreseeable future. Occupancy sensors are a crucial component in realizing this goal.

Occupancy sensors are a common component in many buildings. Typically mounted on ceilings, occupancy sensors detect the presence of occupants within an area. They are most commonly used to control the power delivered to electrical loads, specifically lights, depending on the occupancy of the monitored area. For example, an occupancy sensor may be used to turn off a light in an office when occupancy hasn't been sensed for a period of time, thereby conserving electricity. Conversely, after a period of vacancy, the occupancy sensor may conveniently turn on the light upon sensing occupancy after a period of vacancy. Typically, a signal is transmitted to a switching device, such as a relay or a power pack, to control the load.

Although most commonly used to directly control a load, occupancy sensors are increasingly employed in control systems such as Building Automation Systems (BAS). BASs, also known as Building Management Systems (BMS) and Energy Management Systems (EMS), are employed in buildings and structures to control and monitor a building's mechanical and electrical equipment. BASs are implemented in buildings in varying degrees of complexity and increase efficiency by exploiting relationships of interrelated components and sharing information to more accurately meet demand. In addition to controlling a load, occupancy sensors employed in BASs may also be networked to other components in the system to share information. Networked occupancy sensors may transmit and receive information to other network components such as other occupancy sensors and central controllers.

Building designers and managers now desire and there is now a need for an occupancy sensor with improved functionality.

SUMMARY OF THE INVENTION

It is to be understood that both the general and detailed descriptions that follow are exemplary and explanatory only and are not restrictive of the invention.

According to a first aspect of the invention, the present invention provides an occupancy sensor for determining an occupancy state of a monitored area. The occupancy sensor includes a passive infrared sensor, an ultrasonic transducer sensor, a memory encoding one or more processor-executable instructions and a processor configured to load the one or more processor-executable instructions when encoded from memory. The passive infrared sensor generates a signal based on sensed infrared radiation of the monitored area. The ultrasonic sensor generates a signal based on sensed ultrasonic echo of the monitored area. The one or more processor executable instructions when executed by the processor cause acts to be performed including: receiving at least one signal from the passive infrared sensor and the ultrasonic transducer sensor; sampling the at least one signal at an analog to digital converter to generate at least one sampled signal; passing the at least one sampled signal through a digital bandpass filter to produce at least one filtered signal; comparing the at least one filtered signal to a sensitivity threshold; for each filtered signal, increasing a corresponding count by a first predefined value if the filtered signal is above the sensitivity threshold and decreasing the corresponding count by a second predefined value if the filtered signal is below the sensitivity threshold; for each count, comparing the count to a count threshold and determining the occupancy state of the monitored area based on at least one comparison with the count threshold.

According to a second aspect, the present invention provides a method for detecting an occupancy state of a monitored area, the method comprises the steps of: sampling at least one signal from a passive infrared sensor and an ultrasonic transducer sensor at an analog to digital converter to generate at least one sampled signal; filtering the at least one sampled signal through a digital bandpass filter to produce at least one filtered signal; comparing the at least one filtered signal to a sensitivity threshold; for each filtered signal, increasing a corresponding count by a first predefined value if the filtered signal is above the sensitivity threshold and decreasing the corresponding count by a second predefined value if the filtered signal is below the first sensitivity threshold; for each count, comparing the count to a count threshold and determining the occupancy state of the monitored area based on at least one comparison with the count threshold.

According to a third aspect, the present invention provides a method for detecting an occupancy state of a monitored area, the method comprises the steps of: sampling a first signal from a passive infrared sensor and a second signal from an ultrasonic transducer sensor at an analog to digital converter to produce a first sampled signal and a second sampled signal; filtering the first sampled signal and the second sampled signal through a digital bandpass filter to produce a first filtered signal and a second filtered signal; comparing the first filtered signal and second filtered signal to a sensitivity threshold; increasing a first count by a first predefined value if the first filtered signal is above the sensitivity threshold and decreasing the first count by a second predefined value if the first filtered signal is below the sensitivity threshold; increasing a second count by a first predefined value if the second filtered signal is above the sensitivity threshold and decreasing the second count by a second predefined value if the second filtered signal is below the sensitivity threshold; comparing the first count and the second count to a count threshold; determining the occupancy state of the monitored area to be occupied if at least one of the first count and the second count are larger than the count threshold and the combinational logic operator is an or operator; and determining the occupancy state of the monitored area to be occupied if both the first count and the second count are larger than the count threshold.

DISCLOSURE OF INVENTION

Brief Description of Drawings

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWING

Figure 1:
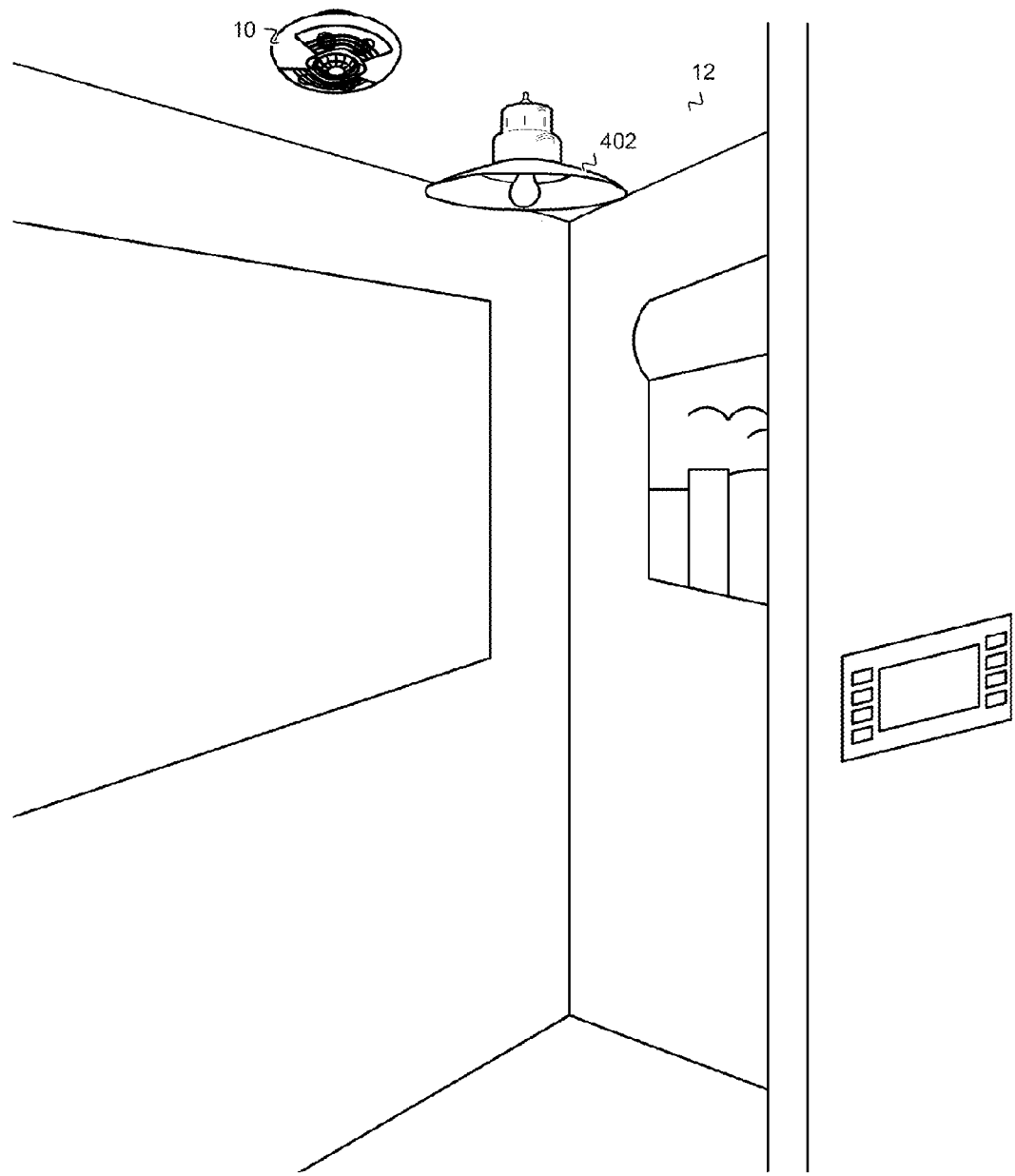

FIG. 1 illustrates an occupancy sensor mounted in a conference room, in accordance with an illustrative embodiment of the invention.

Figure 2:
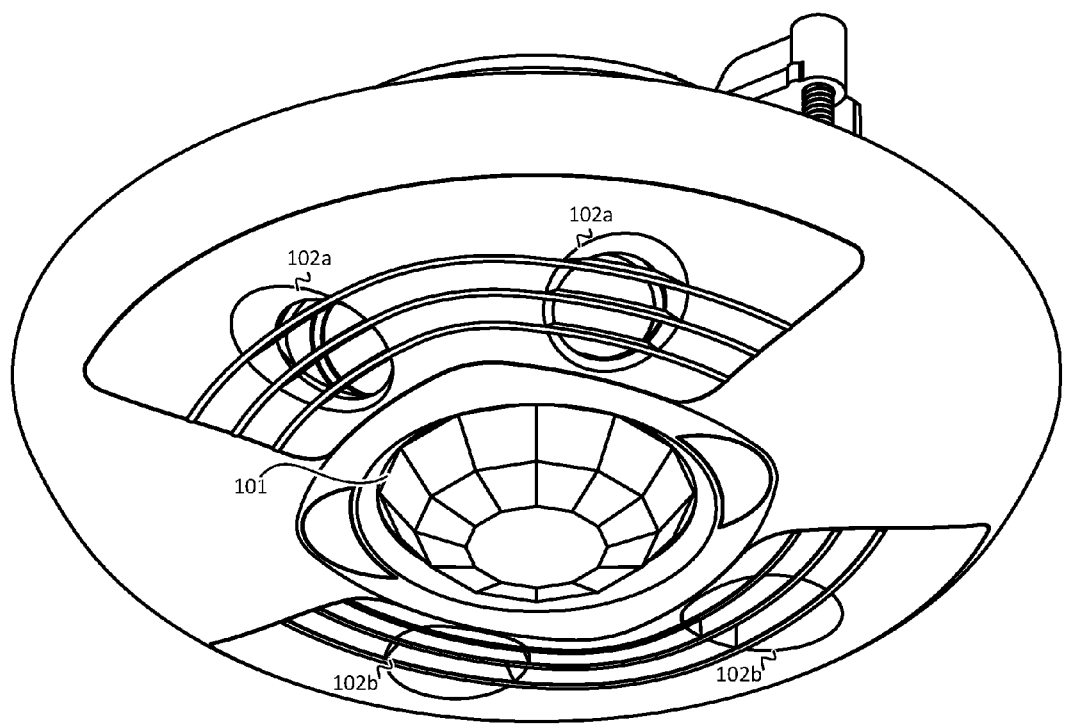

FIG. 2 is a front view of the occupancy sensor, in accordance with an illustrative embodiment of the invention.

Figure 3:
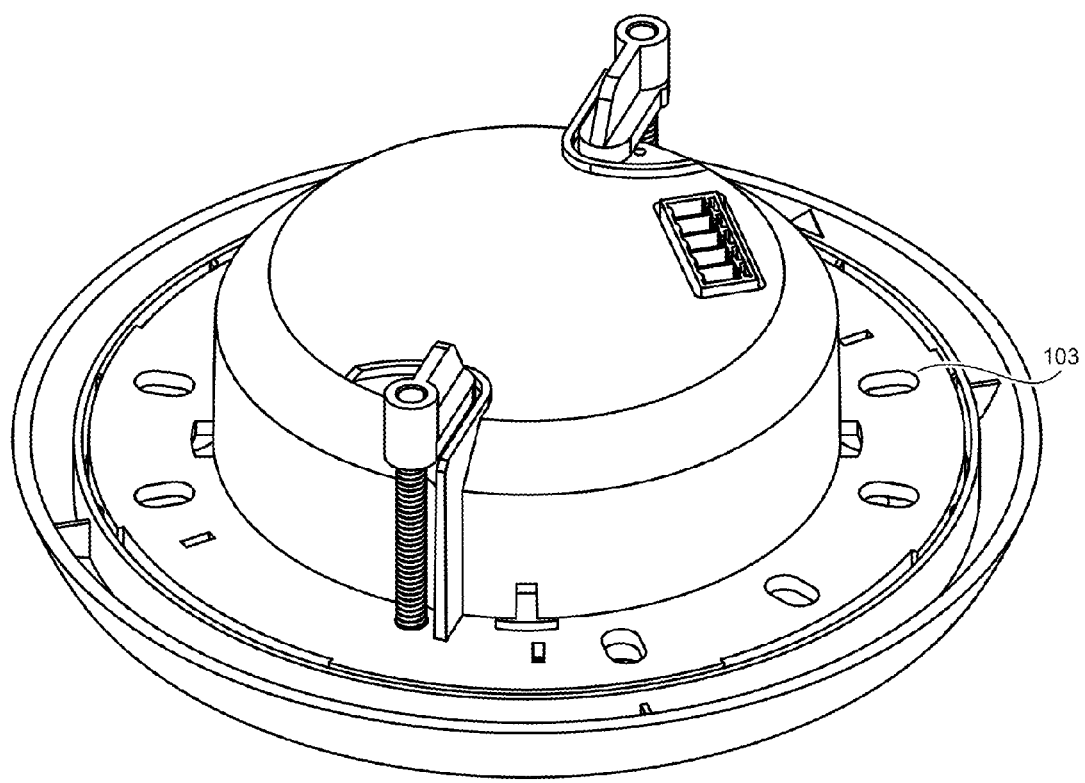

FIG. 3 is a back view of the occupancy sensor, in accordance with an illustrative embodiment of the invention.

Figure 4:
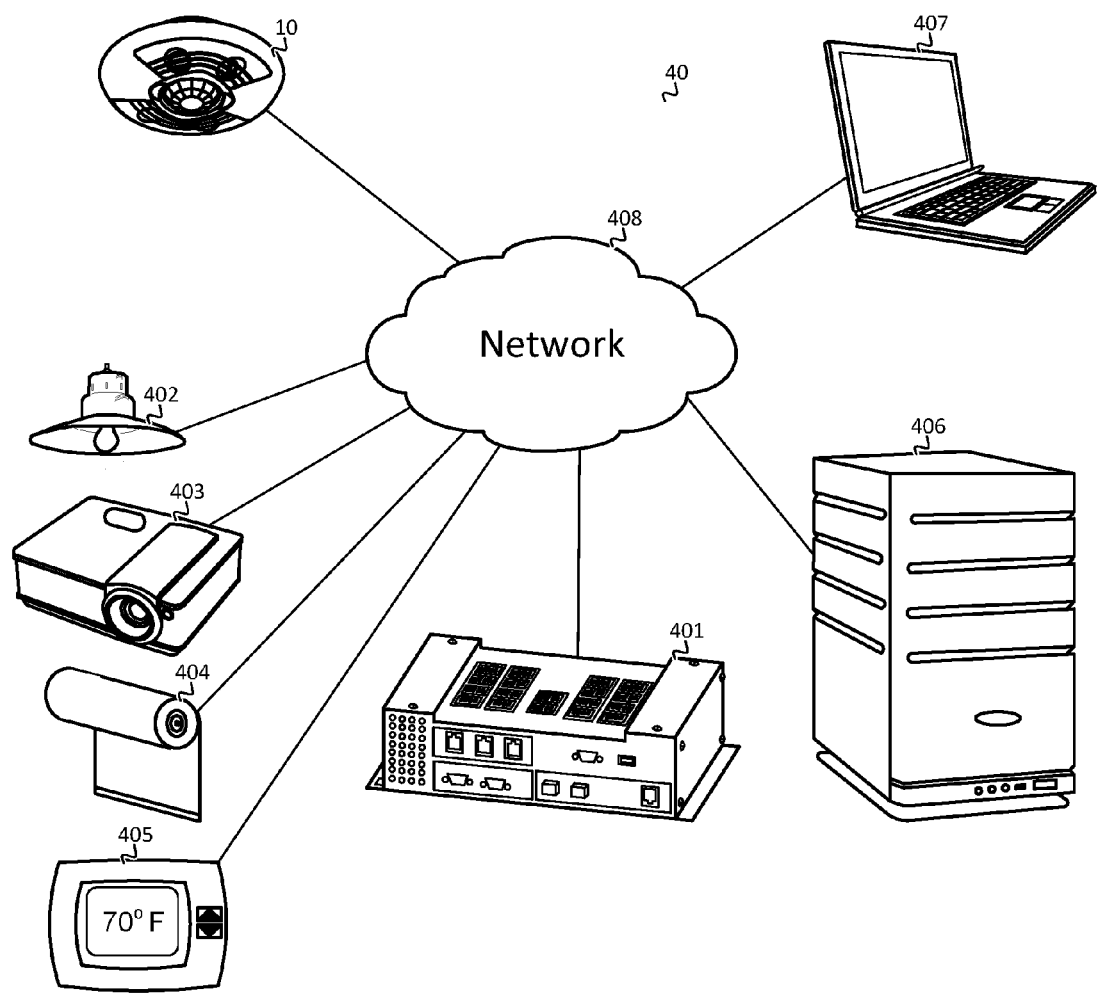

FIG. 4 illustrates a control system including the occupancy sensor, in accordance with an illustrative embodiment of the invention.

Figure 5:
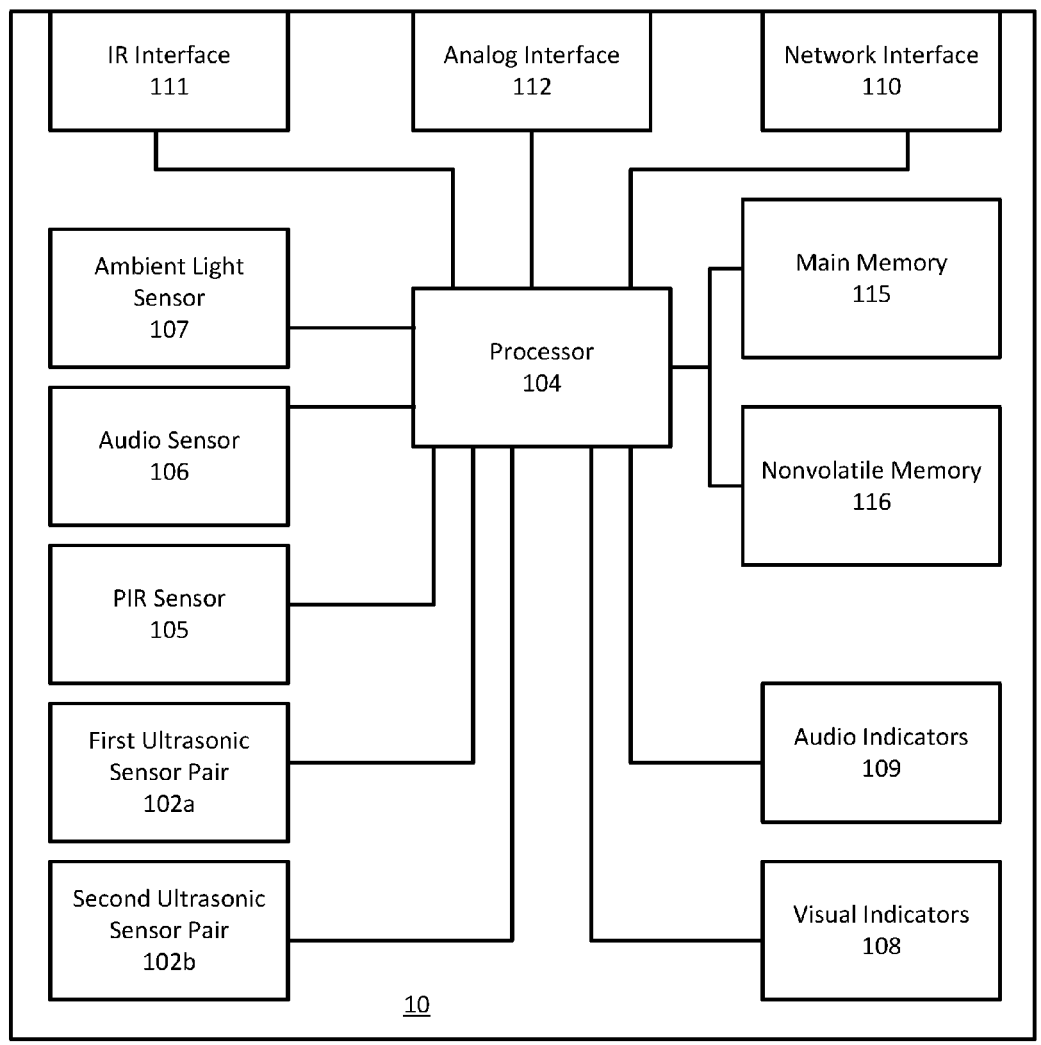

FIG. 5 is a block diagram of the occupancy sensor, in accordance with an illustrative embodiment of the invention.

Figure 6:
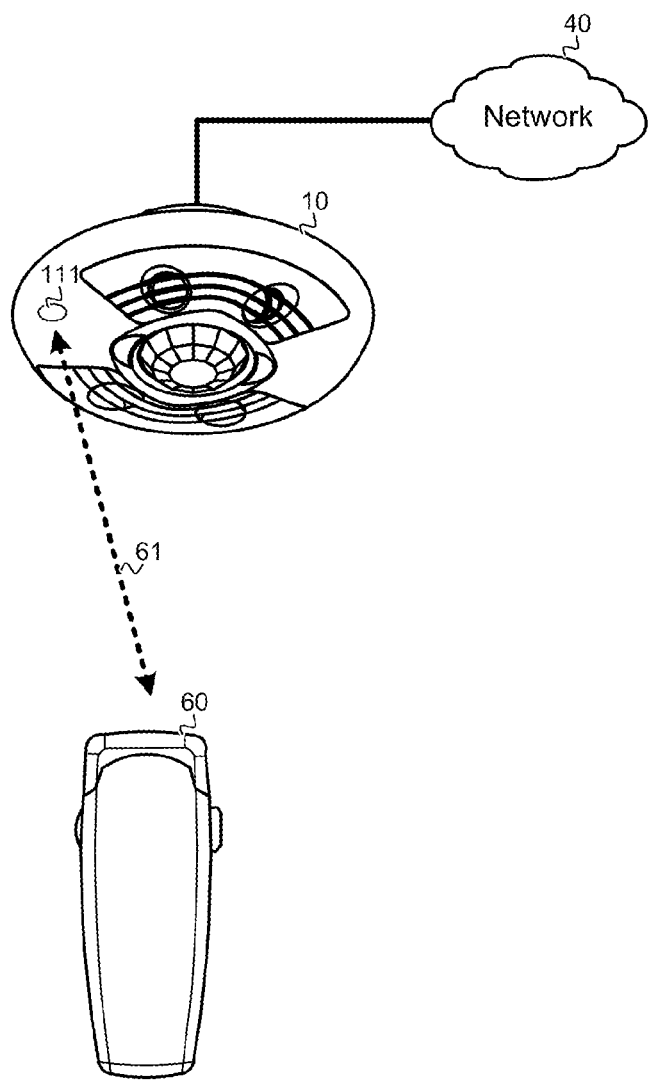

FIG. 6 illustrates the occupancy sensor communicating with a handheld remote control, in accordance with an illustrative embodiment of the invention.

Figure 7:
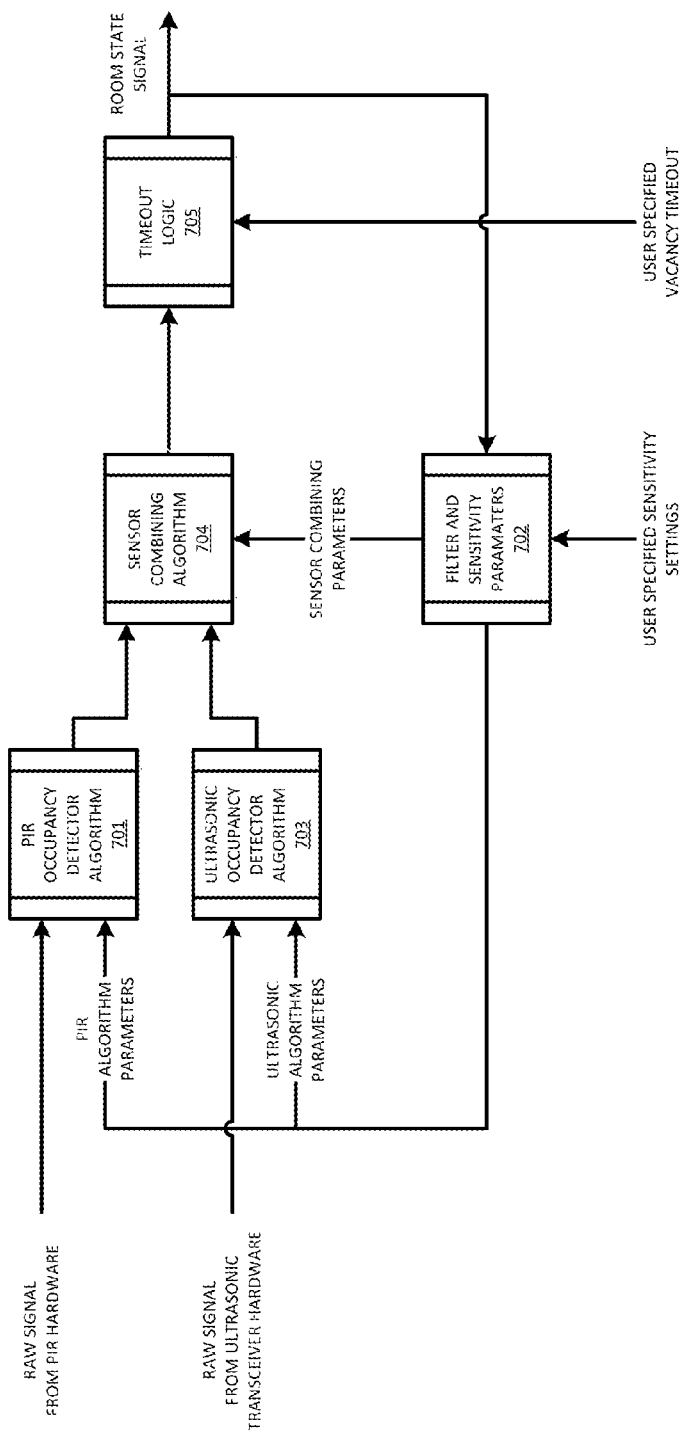

FIG. 7 is a flow diagram describing a method for detecting an occupancy state of a monitored area, in accordance with an illustrative embodiment of the invention.

Figure 8:
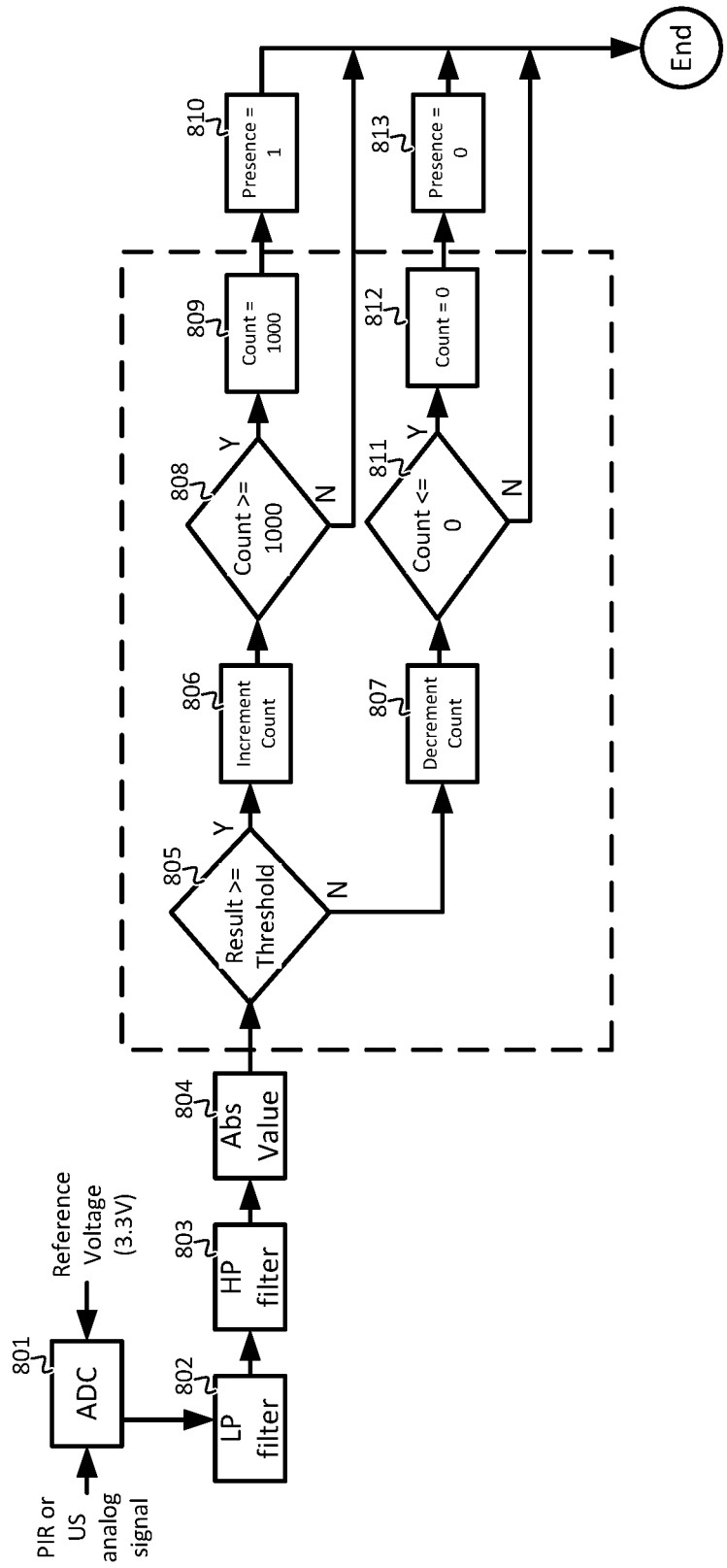

FIG. 8 is a flow diagram describing a method for detecting an occupancy state of a monitored area, in accordance with an illustrative embodiment of the invention.

Figure 9:
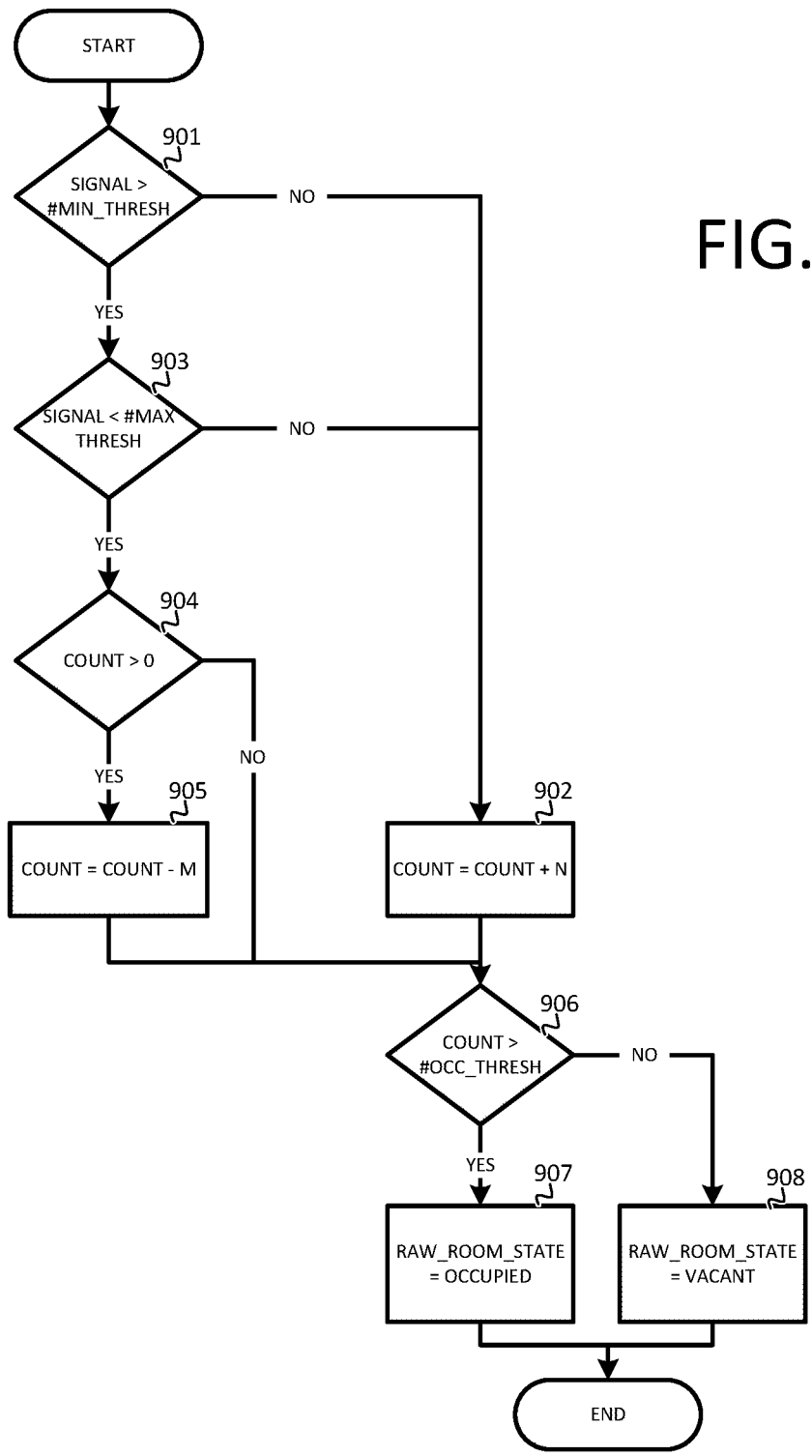

FIG. 9 is a flow diagram describing a method for detecting an occupancy state of a monitored area, in accordance with an illustrative embodiment of the invention.

Figure 10:
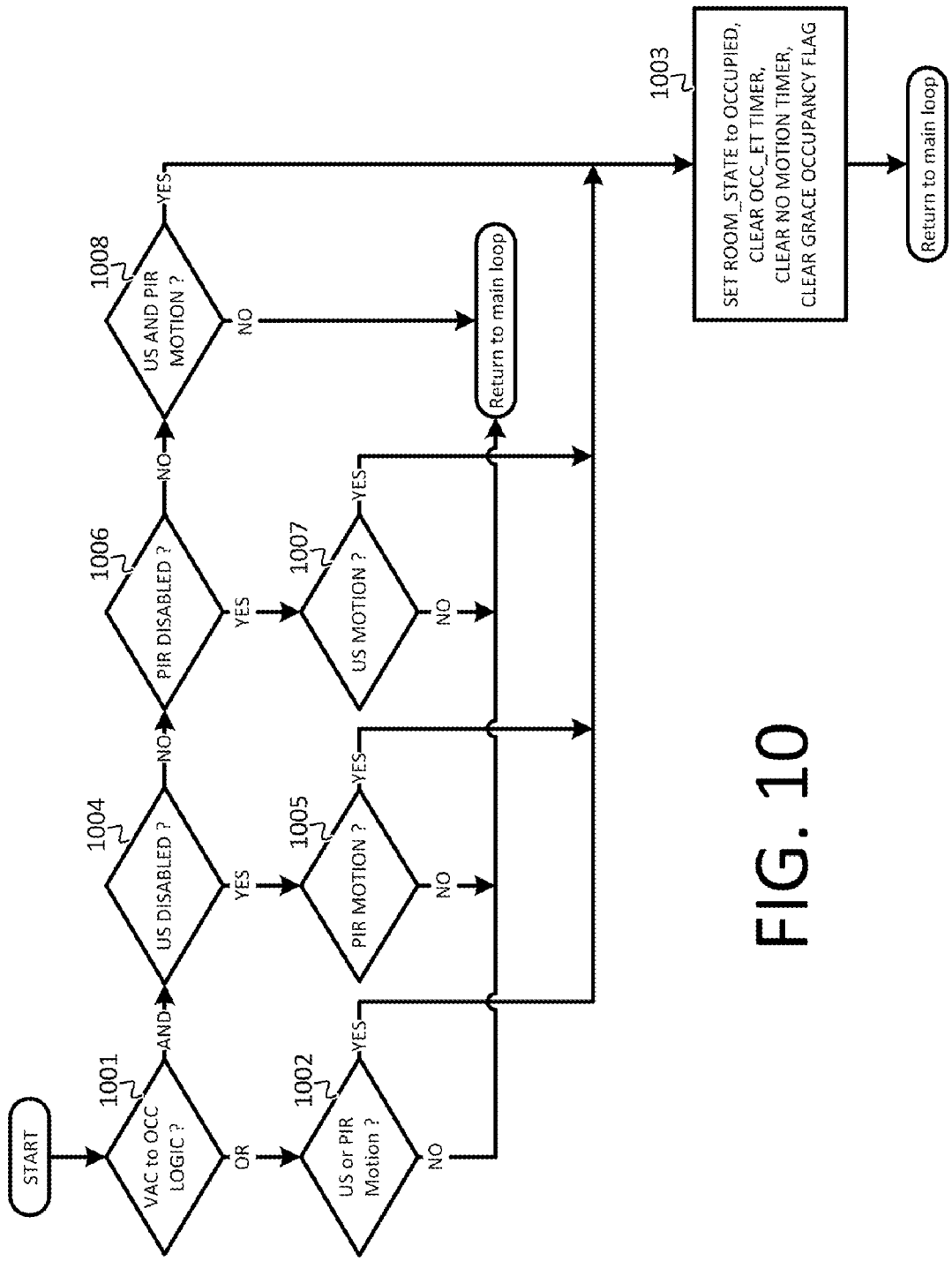

FIG. 10 is a flow diagram describing a method for combining sensing technologies, in accordance with an illustrative embodiment of the invention.

Figure 11:
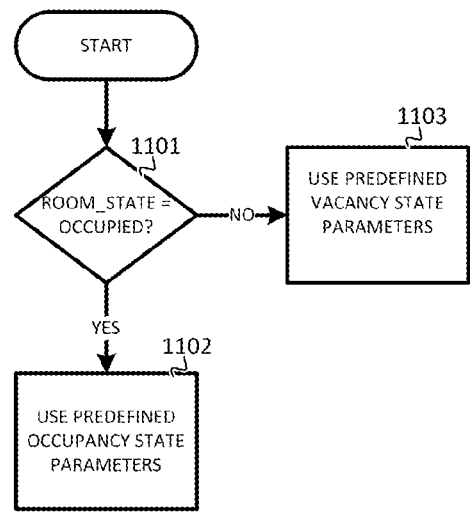

FIG. 11 is a flow diagram describing a method for determining which parameters to employ in an occupancy sensor, in accordance with an illustrative embodiment of the invention.

Figure 12A:
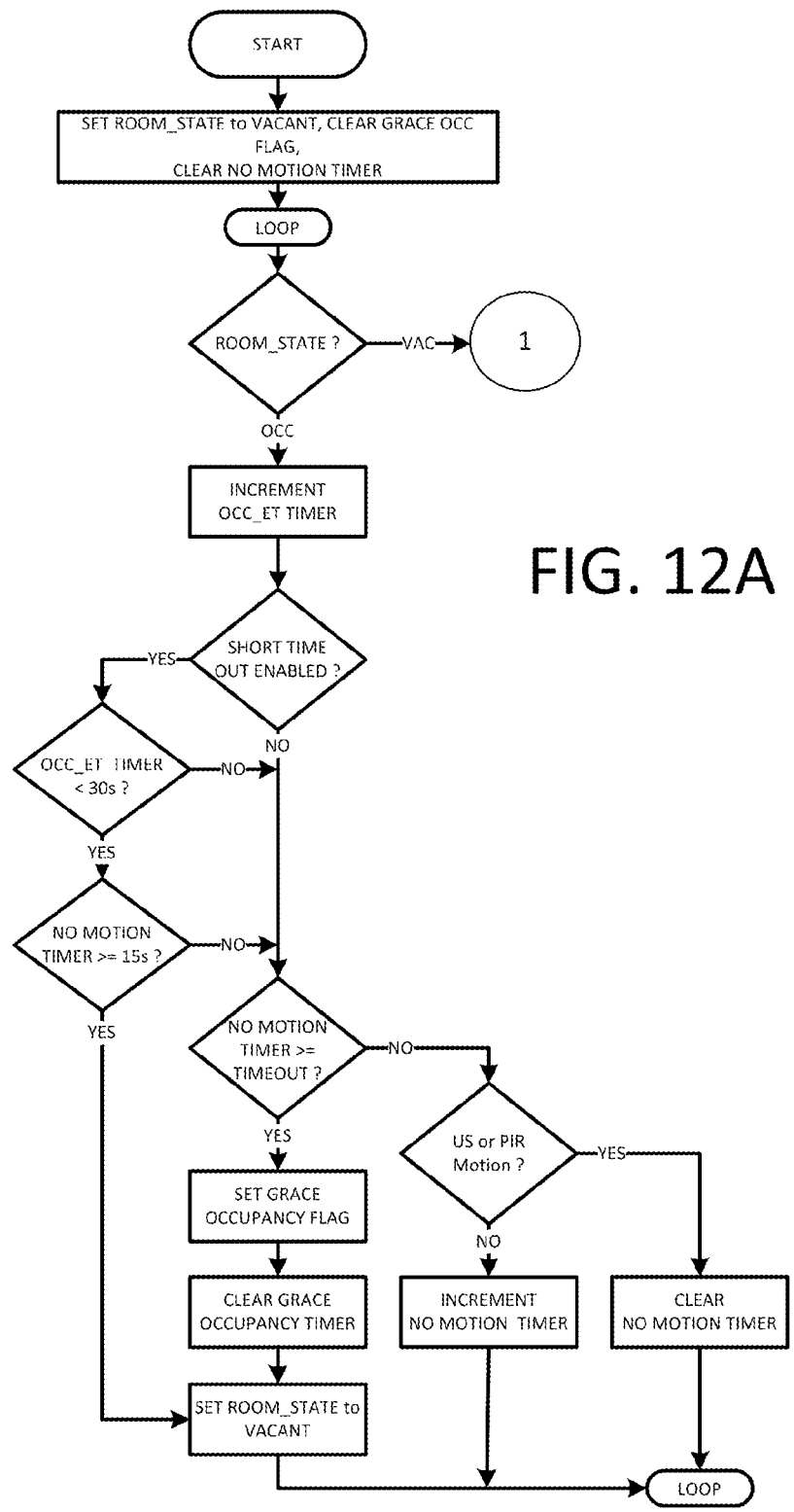
Figure 12B:
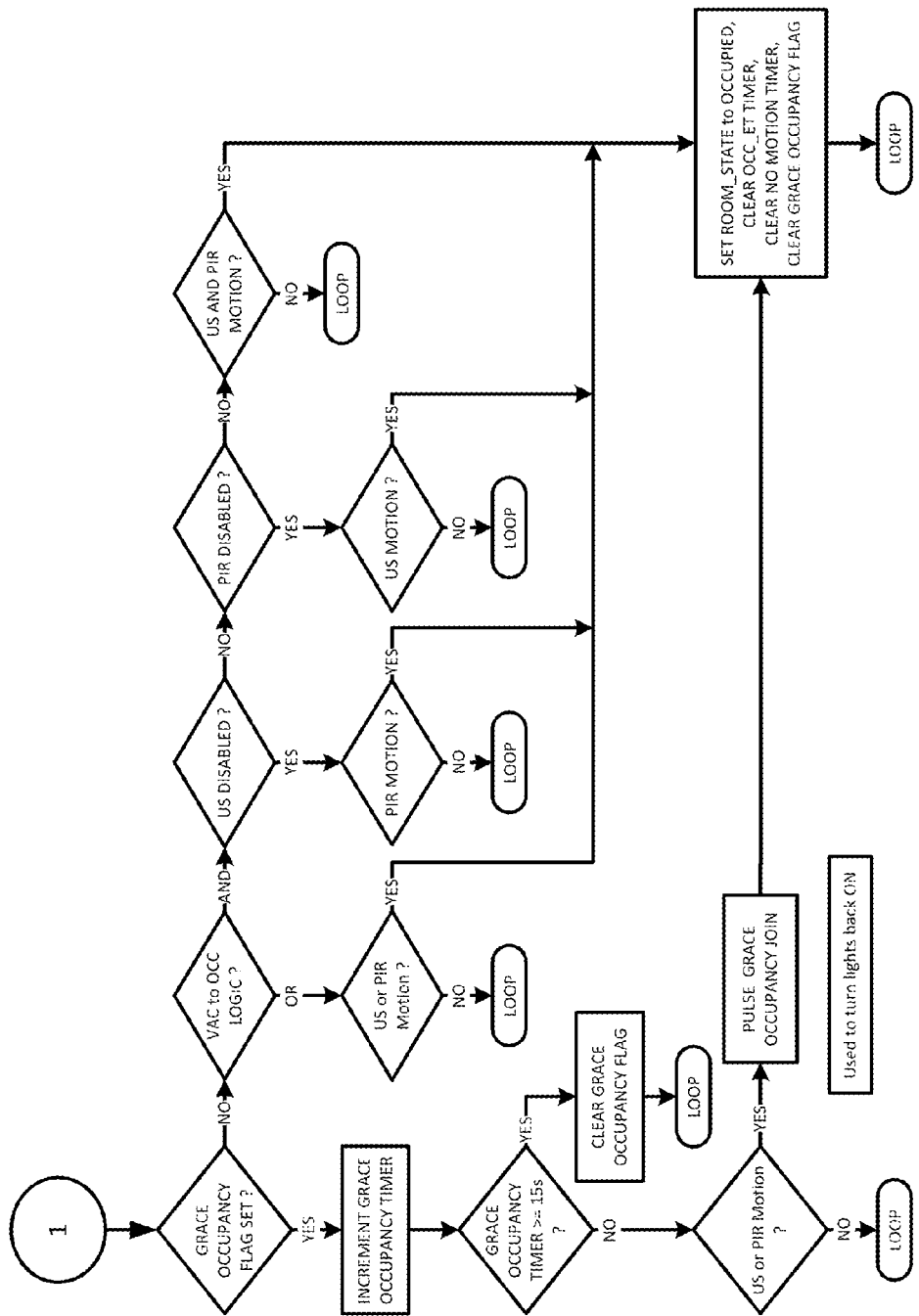

FIGS. 12A and 12B are flow diagrams describing a method for detecting an occupancy state of a monitored area, in accordance with an illustrative embodiment of the invention.

Figure 13:
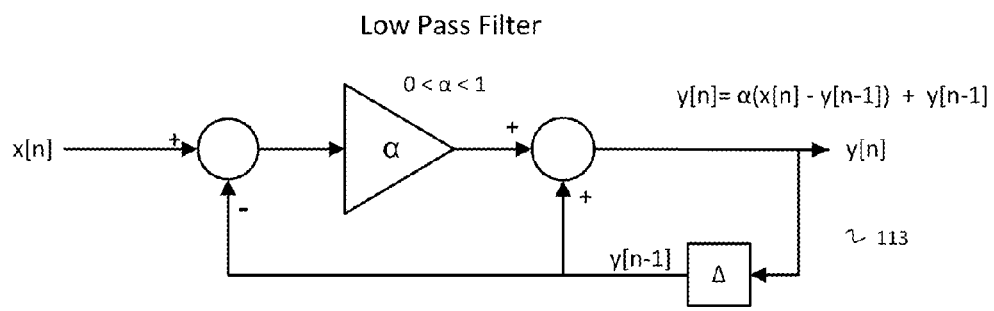

FIG. 13 illustrates a low pass filter, in accordance with an illustrative embodiment of the invention.

Figure 14:
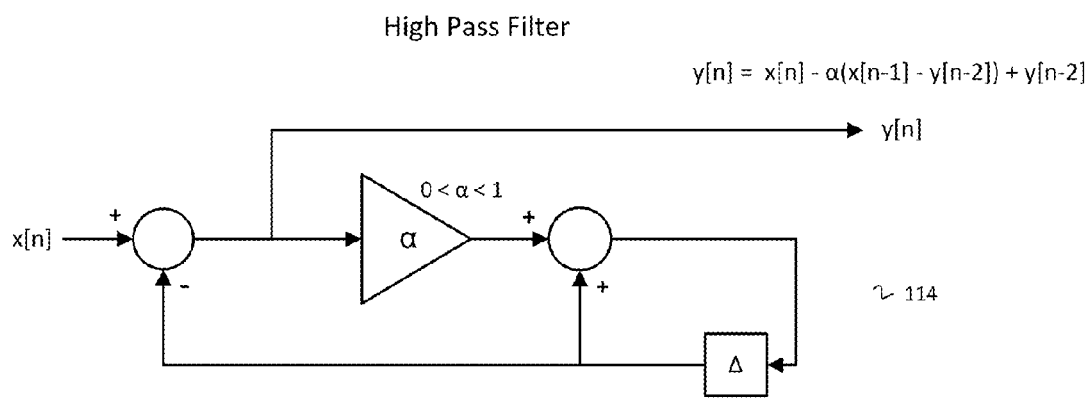

FIG. 14 illustrates a high pass filter, in accordance with an illustrative embodiment of the invention.

LIST OF REFERENCE NUMBERS FOR THE MAJOR ELEMENTS IN THE DRAWING

The following is a list of the major elements in the drawings in numerical order.

- 10 occupancy sensor
- 12 conference room
- 40 control network
- 60 remote
- 61 wireless communication channel
- 101 Fresnel lens
- 102a first pair ultrasonic transducer sensor
- 102b second pair ultrasonic transducer sensor
- 103 hole
- 104 central processing unit
- 105 passive infrared sensor
- 106 audio sensor
- 107 ambient light sensor
- 108 visual indicator
- 109 audio indicator
- 110 network interface
- 111 wireless communication interface
- 112 analog interface
- 113 low pass filter
- 114 high pass filter
- 115 main memory
- 116 nonvolatile memory
- 401 control processor
- 402 lighting device
- 403 audiovisual device
- 404 shade device
- 405 HVAC device
- 406 scheduling server
- 407 computer
- 408 communication network
- 701 passive infrared occupancy detector algorithm
- 702 filter and sensitivity parameters
- 703 ultrasonic occupancy detector algorithm
- 704 sensor combining algorithm
- 705 timeout logic
- 801 (step of) sampling signal
- 802 (step of) filtering signal at high pass filter
- 803 (step of) filtering signal at low pass filter
- 804 (step of) taking absolute value
- 805 (step of) comparing result to a sensitivity threshold
- 806 (step of) incrementing count
- 807 (step of) decrementing count
- 808 (step of) comparing count to a count threshold
- 809 (step of) setting count equal to the count threshold
- 810 (step of) setting presence equal to occupied
- 811 (step of) comparing count to zero
- 812 (step of) setting count equal to zero
- 813 (step of) setting presence equal to vacant
- 901 (step of) comparing signal to a minimum sensitivity threshold
- 902 (step of) incrementing count
- 903 (step of) step of comparing signal to a maximum sensitivity threshold
- 904 (step of) determining if count is greater than zero
- 905 (step of) decrementing count
- 906 (step of) comparing count to a count threshold
- 907 (step of) determining room state to be occupied
- 908 (step of) determining room state to be vacant
- 1001 (step of) determining combinational logic operator
- 1002 (step of) determining if ultrasonic or passive infrared motion detected
- 1003 (step of) setting occupancy state to occupied
- 1004 (step of) determining if ultrasonic sensor disabled
- 1005 (step of) determining if passive infrared motion detected
- 1006 (step of) determining if ultrasonic motion detected
- 1007 (step of) determining if ultrasonic and passive infrared motion detected
- 1101 (step of) determining if room state is occupied
- 1102 (step of) using predefined occupancy state parameters
- 1103 (step of) using predefined vacancy state parameters

DETAILED DESCRIPTION OF THE INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of the disclosure, are to be considered within the scope of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

MODE(S) FOR CARRYING OUT THE INVENTION

The present invention involves an inventive occupancy sensor. More specifically, the present invention provides an occupancy sensor that detects occupancy conditions with improved functionality. The occupancy sensor detects occupancy with multiple types of sensors.

The occupancy sensor comprises a low-voltage passive infrared (PIR) sensor and ultrasonic transducer sensor. The occupancy sensor operates on a control network to control lighting and other networked devices. The occupancy sensor operating settings are remotely configurable such as via a graphic user interface on a network device or an IR setup remote. The sensor is typically employed to turn lights on when a room or area is occupied and to shut them off when the room or area is vacated. However, the occupancy sensor is not limited to such function. The occupancy sensor combines ultrasonic motion detection sensing, which provides high sensitivity, and PIR motion detection sensing, which provides high immunity to false triggering. Additionally, an integrated photocell allows for daylight harvesting applications.

FIG. 1 shows the inventive occupancy sensor mounted in a conference room, according to an embodiment of the invention.

The occupancy sensor 10 detects the occupancy state of the conference room 12 and generates an occupancy signal based on the occupancy state of that monitored area. For example, the occupancy sensor may generate a binary signal with one logical level representing an occupied state and the other logic level representing a vacant state. Occupancy determinations may be dependent on a number of settings of the occupancy sensor 10 which may be preconfigured or configured through physical interfaces on the occupancy sensor 10 or remotely via a graphic user interface (GUI) or remote control 60 (FIG. 6). Additionally, sensitivity settings may be determined according to one or more factors such as time event like time of day, day of week or month of year, a scheduled event, the current occupancy state of the monitored area or the occupancy state of another area. The sensitivity setting may be determined either locally at the occupancy sensor 10 or at a network device and transmitted to the occupancy sensor 10. For example, the timeout period of the occupancy sensor 10 may be set. Additionally, the sensitivity of the individual sensors may be set. Finally, the physical direction of the sensors' operational range may be set by altering a mask of the occupancy sensor 10.

In an embodiment of the invention, a first sensitivity setting and a second sensitivity setting of the occupancy sensor may be set at a more sensitive level when the monitored area is expected to be occupied such as during normal business hours or when there is a scheduled meeting. Correspondingly, the sensitivity may be decreased when the monitored area is expected to be vacant such as during night hours, off-season or when there is no scheduled event.

FIG. 2 is a front view of the occupancy sensor, in accordance with an illustrative embodiment of the invention.

FIG. 3 is a back view of the occupancy sensor, in accordance with an illustrative embodiment of the invention. The front of the occupancy sensor 10 comprises a Fresnel lens 101 disposed in center of the occupancy sensor 10 for focusing the light to the PIR sensor 105 (FIG. 5). Beneath the PIR sensor 105, a mask (not shown) is inserted. The mask has twelve thirty (30) degree removable segments that allow masking particular areas to prevent undesirable triggers from affecting the sensor operation. The two pairs of ultrasonic sensors are disposed in depressions in the front surface.

The back surface of the occupancy sensor 10 comprises holes 103 for mounting screws. The occupancy sensor 10 may be mounted in a drop ceiling or in a standard wall box, such as a 4" junction box. Advantageously, the mechanical design allows for the occupancy sensor 10 to be mounted in the junction box at various angles, thereby allowing the sensor direction to be optimized for the room shape regardless of the orientation of the mounting box.

The occupancy sensor 10 is mounted on the ceiling of a monitored area, such as the conference room 12, either in a ceiling wall box or directly to a ceiling panel, such as with adhesives, fasteners or other attachment means.

FIG. 4 illustrates a control network 40 comprising the occupancy sensor 10, according to an illustrative embodiment of the invention. The control network 40 comprises a control processor 401, one or more controllable devices such as a lighting device 402, an AV device 403, a shade device 404 and an HVAC device 405, a scheduling server 406, a computer 407, and a communication network 408.

The occupancy sensor 10 is configured to communicate on the control network 40 via one or more communication interfaces. For example, the occupancy sensor 10 may be in communication with the control network 40 via a wired RS-485 communication interface. The occupancy sensor 10 may provide information regarding the monitored area to a control processor 401 either directly or via intermediate devices. The control processor 401 may employ the information to control one or more elements of a structure, log statistics for the area or any number of other uses.

Typically, the occupancy state determination of the occupancy sensor 10 is employed to control one or more lights 402 in the monitored area. However, the control network 40 may employ the occupancy sensor 10 information with one or more logic engines to control media equipment including AN equipment 403, shading and drapery elements 404, HVAC elements 405, security elements (not shown), and other controllable device residing on the control network 40.

The occupancy sensor 10 outputs a signal representing whether the room is determined to be occupied or vacant, the occupancy state. The occupancy sensor 10 takes into account a timeout period which may typically be up to thirty minutes, thereby preventing lights from falsely turning off when occupants are still for short periods of time.

In an embodiment of the invention, the occupancy sensor 10 provides one or more control processors 401 of the control network 40 with both the occupancy state as well as one or more raw signals corresponding to the current detection state of the ultrasonic and PIR sensors individually. Advantageously, the raw signals will provide immediate feedback to the control system on whether there is motion or not. The control processor 401 may employ this feedback for control purposes, such as by using the standard occupancy signal for certain devices and the raw signals for other more sensitive systems such as security, for logging purposes, or to determine the effectiveness of current settings on the occupancy sensor 10 such as timeout, sensitivity and directional settings of the sensor.

FIG. 5 is an illustrative block diagram of the inventive occupancy sensor 10 according to an embodiment of the invention. The occupancy sensor 10 may include at least one central processing unit (CPU) 104. For example, the CPU 104 may represent one or more microprocessors, and the microprocessors may be "general purpose" microprocessors, a combination of general and special purpose microprocessors, or application specific integrated circuits (ASICs). Additionally or alternatively, the CPU 104 may include one or more reduced instruction set (RISC) processors, video processors, or related chip sets. The CPU 104 may provide processing capability to determine an occupancy state of a monitored area from one or more sensor inputs. The processor is configured to determine the occupancy or vacancy of the monitored area according to one or more algorithms as will be described more fully below.

A main memory 115 may be communicably coupled to the CPU 104, which may store data and executable code. The main memory 115 may represent volatile memory such as RAM, but may also include nonvolatile memory, such as read-only memory (ROM) or Flash memory. In buffering or caching data related to operations of the CPU 104, the main memory may store data associated with applications running on the occupancy sensor 10.

In an embodiment, the occupancy sensor 10 includes nonvolatile storage 116. The nonvolatile storage 116 may represent any suitable nonvolatile storage medium, such as a hard disk drive or nonvolatile memory, such as Flash memory. Being well-suited to long-term storage, the nonvolatile storage 116 may store data files and software (e.g., for implementing functions on the occupancy sensor 10).

The occupancy sensor 10 comprises a PIR sensor 105. The PIR sensor 105 measures infrared light radiating from objects in its field of view. The occupancy sensor 10 further comprises a first pair of ultrasonic transducer sensors 102a and a second pair of ultrasonic transducer sensors 102b. The first and second pair 102a, 102b of ultrasonic transducer sensors generate high frequency sound waves and evaluate the echoes which is received back by the sensors.

The occupancy of the monitored area is determined collectively from the two sensor technologies according to individual settings of each sensor technology as well as a combinational logic operator. Users may desire to change the sensitivity of the occupancy sensor 10 to account for environment or according to personal preference. It will be appreciated that the sensitivity of the occupancy sensor 10 may be adjusted by either adjusting individual sensor technology settings, such as threshold values, or by adjusting the combinational logic operators.

The sensitivity of the occupancy sensor 10 can be selected by a user from a handheld remote or can be configured from a control processor 401 over a network. Additionally, the sensitivity settings can be determined based on control system logic and other factors such as a time event, like time of day, day of week, or month, a scheduled event like a meeting, the current occupancy state of the monitored area, and the occupancy state of other areas in the immediate vicinity.

Advantageously, the sensitivity of the occupancy sensor 10 can be increased once a room is occupied to ensure lights do not turn off accidentally when occupants are still. Sensitivity could then be reduced once the room is deemed vacant to avoid falsely turning on lights as a result of motion nearby such as someone walking past the door of a room in which sensor is installed or HVAC unit is turning on.

The timeout setting may also be set from a handheld remote or control system over the network. Additionally, the timeout settings can be determined based on control system logic and other factors such as: time of day, day of week, state of the current room, and state of other rooms/areas in the immediate vicinity. Advantageously, a user or technician can reduce the timeout when a room or building is typically not in use to avoid lights being left on for extended periods of time after being triggered by an occupant walking through the space.

One or more of the ultrasonic transducer pairs may be locally or remotely disabled to further tailor the range and responsiveness of the occupancy sensor 10. The pairs can be remotely disabled from a remote control 60 or via the control network 40. This is beneficial in applications where the sensor is positioned such that one pair of transducers may be falsely triggered by motion outside the monitored space.

The occupancy sensor 10 further comprises an audio sensor 106, such as a microphone, for sensing audio in the monitored area and an ambient light sensor for sensing ambient light in the monitored area. In an embodiment of the invention, the microphone provides a measure of audible sound in the room and may be employed to qualify PIR or ultrasonic motion detections. For example, in certain applications detection of sounds in the monitored area may be required before the occupancy state is determined. Additionally, the microphone signal can be used to prolong the occupancy state once it is established. In an embodiment of the invention, the ambient light sensor 107 is employed in daylight harvesting applications.

The occupancy sensor 10 further comprises one or more visual indicators 108 such as indicator lights. In an embodiment of the invention, the occupancy sensor 10 comprises red and green light emitting diodes (LEDs) visible through the PIR lens. The occupancy sensor 10 further comprises an audio indicator 109 such as a beeper for audio feedback.

The occupancy sensor 10 further comprises a network interface 110, a wireless communication interface 111 and an analog interface 112. The network interface 110 is configured for communicating on a network. In an embodiment of the invention, the network interface 110 is an RS485 wired connection. In a further embodiment of the invention, the network interface 110 is a power over Ethernet (PoE) interface for receiving electric power as well as for sending and receiving signals over an Internet Protocol (IP) based network. The occupancy sensor 10 may provide the occupancy state and the one or more raw signals to the network via the network interface 110. Additionally, the occupancy sensor 10 may relay information from one or more devices to the control network 40 via the network interface 110. The occupancy sensor 10 may receive information from a second occupancy sensor 10. Additionally, the occupancy sensor 10 may receive information from one or more devices such as a remote control 60 via a wireless communication interface 111 such as an IR interface or an RF interface.

The network interface 110 is configured to receive information from the network, such as sensor settings. In an embodiment of the invention, the occupancy sensor 10 is further configured to relay information from the control network 40 to one or more devices such as a second occupancy sensor 10 via a wired connection or a remote control 60 via a wireless interface.

FIG. 6 illustrates the occupancy sensor 10 communicating with a remote control 60, in accordance with an illustrative embodiment of the invention. In an embodiment of the invention, the wireless communication interface 111 is an infrared (IR) interface. In this embodiment, the occupancy sensor 10 comprises a wireless transceiver, such as an IR transceiver configured for bi-directional wireless communication on wireless communication channel 61 with the remote control 60. The remote control 60 may be a touch-panel, a smart phone, a tablet computer or any other similar known device capable of communicating wirelessly with the occupancy sensor 10. The occupancy sensor 10 may receive settings or other information from the remote control 60 and report back its current settings to the remote control 60.

The occupancy sensor 10 receives data as RC-5 encoded IR messages from a remote control 60 via the IR interface 111. The occupancy sensor 10 is configured for decoding the message and transmitting a network message, i.e. the data and address, to the control network 40 via the network interface 110. Conversely, the occupancy sensor 10 is configured to receive a network message from the control network 40 via the network interface 110 and encode and transmit the message as an RC-5 encoded IR code to a remote control 60 or other external device capable of receiving RC-5 encoded IR codes. Advantageously, this allows one or more devices in the room to be controlled via the occupancy sensor 10.

The analog interface 112 (FIG. 5) may provide a wired connection for communicating with another occupancy sensor 10. By networking the sensors, either through the analog interface 112 or via the control system network, multiple sensors covering a large area may communicate with one another. Advantageously, if one sensor declares the room vacant, the other sensors can be informed to operate in a more sensitive setting to guarantee occupancy is not lost as people move from one sensor area to another.

FIG. 7 is a flow diagram describing a method for determining an occupancy state of a monitored area, in accordance with an illustrative embodiment of the invention. The central processing unit (CPU) 104 receives raw signals from the PIR sensor 105 and ultrasonic transducer sensors 102. The CPU 104 executes a PIR occupancy detector algorithm 701 according to PIR algorithm parameters to determine whether the PIR sensor 105 detected motion. The CPU 104 executes ultrasonic occupancy detector algorithm 703 according to ultrasonic algorithm parameters to determine whether the ultrasonic transducer sensors 102 detected motion. The PIR algorithm parameters and ultrasonic algorithm parameters comprise a sensitivity threshold and a count threshold.

The CPU 104 executes a sensor combining algorithm 704 from the outputs of the PIR occupancy detection algorithm 701 and the ultrasonic occupancy detection algorithm 703 to produce a single motion determination from the two. The sensor combining algorithm 704 operates according to sensor combining parameters. The sensor combining parameters comprise a combinational logic operator such as an or operator and an and operator.

The CPU 104 executes timeout logic 705 on the output of the sensor combining algorithm 704 to determine the occupancy state of the room and generates a room state signal. The timeout logic 705 operates according to a user specified vacancy timeout. The room state signal is output from the occupancy sensor 10 for use to control one or more devices and provide information about the monitored area.

The room state signal is additionally input into a filter and sensitivity parameters circuit block 702. This signal, along with user specified sensitivity settings determine the PIR occupancy detector algorithm parameters, ultrasonic occupancy detector algorithm parameters and sensor combining parameters.

The central processing unit (CPU) 104 employs the occupancy detector algorithm to process analog signals from the one or more sensors to determine the room state. In an embodiment of the invention, analog signals from the PIR and ultrasonic sensing devices are sampled by a microcontroller analog to digital converter (ADC) and passed through a digital bandpass filter. For each sensor, the filtered result is then compared to a sensitivity threshold and a count is incremented by a variable "n" if above the sensitivity threshold and decremented by a variable "m" when below the sensitivity threshold. Each count is then compared to a count threshold. When the count is above or equal to the count threshold the algorithm determines motion to be present. When the count is below the count threshold, the algorithm determines motion to be absent. Advantageously, this allows the sensitivity threshold to be set close to the noise floor. Multiple detections add up over time until the count threshold is met. Accordingly, greater sensitivity can be obtained in the presence of noise.

This digital implementation allows various stages of the filter to be adjusted based on installation conditions. In an embodiment of the invention, the high pass frequency cutoff setting, low pass frequency cutoff setting, and the sensitivity and count thresholds may be adjusted. Advantageously, specific frequencies of noise may be filtered or disregarded depending on installation. For example, the programmable band pass filter allows for the rejection of low or high frequency noise such as that caused by vibrating HVAC ducts and vents.

Additionally, because the CPU 104 monitors the PIR and ultrasonic analog signals via its ADC, the option to customize the processing is available. For example, a person moving through a PIR lens window generates a positive as well as a negative response. The PIR occupancy detection algorithm in this case can be modified to require both a positive and a negative response within a time window.

FIG. 8 is a flow diagram describing a method for determining the occupancy state of a monitored area, in accordance with an illustrative embodiment of the invention. The method shown is employed separately on the signal received from the PIR sensor 105 and the signal received from the ultrasonic transducer sensor pair 102. In step 801, the sensor signal is sampled at an ADC to produce a sampled signal. The ADC may be input a reference voltage, such as 3.3 Volts and sampled at a one kilohertz sampling rate.

In step 802, the sampled signal is filtered of low frequencies by a low pass (LP) filter 113 (FIG. 13). The low pass filter 113 operates according to a low pass cutoff setting which may be configured by the user or determined according to one or more factors such as a time event, a scheduled event, and occupancy state. The low pass filter is configured for removing direct current voltages and low frequency signals in the range of one to ten hertz. The low pass filter may be a one stage IIR filter.

In step 803, the sampled signal is filtered of high frequencies by a high pass (HP) filter 114 (FIG. 14). The high pass filter 114 operates according to a high pass cutoff setting which may be configured by the user or determined according to one or more factors such as a time event, a scheduled event, and occupancy state. The high pass filter is configured for removing high frequency signals. The high pass filter may be a one stage IIR filter. In an embodiment of the invention, step 802 and step 803 may be performed by a single filter such as by a digital bandpass filter.

FIG. 13 illustrates a low pass filter 113, in accordance with an illustrative embodiment of the invention. FIG. 14 illustrates a high pass filter 114 in accordance with an illustrative embodiment of the invention.

In step 804, the signal is processed such that the absolute value of the signal is employed.

In step 805, the filtered signal is compared to a sensitivity threshold.

In step 806, if the filtered signal is greater than the sensitivity threshold, a count is incremented by a first predefined value "n". In this embodiment, greater means greater than or equal to.

In step 807, if the filtered signal is less than the sensitivity threshold, the count is decremented by a second predefined value "m". In embodiments of the invention, the first and second predefined values "n" and "m" are equal.

In step 808, the count is compared to a count threshold. In the embodiment shown in FIG. 8, the count threshold is one thousand (1000). However, the count threshold is not limited to one thousand.

In step 809, if the count is greater than or equal to the count threshold, the count is set to the count threshold and in step 810, presence is set as occupied. In this embodiment, a value of one represents occupied.

In step 811, if the count is decremented, a determination is made if the count is less than or equal to zero.

In step 812, if the count is less than or equal to zero, the count is set to zero and in step 813, presence is set as vacant. In this embodiment, a value of zero represents vacant.

FIG. 9 is a flow diagram describing a method for determining the occupancy state of a monitored area, in accordance with an illustrative embodiment of the invention. FIG. 9 describes the comparison portion of the method of FIG. 8 in more detail. In step 901, the filtered signal is compared to a minimum sensitivity threshold.

If the filtered signal is less than or equal to the minimum sensitivity threshold, the count is incremented in step 902 by a first predefined value, "n".

If the filtered signal is greater than the minimum sensitivity threshold, in step 903, the filtered signal is compared to a maximum sensitivity threshold. The maximum sensitivity threshold is greater than or equal to the minimum sensitivity threshold. If the signal is greater than or equal to the maximum sensitivity threshold, the count is incremented in step 902.

If the signal is less than the maximum sensitivity threshold, in step 904, it is determined whether the count is greater than zero. If the count is greater than zero, then in step 905, the count is decremented by a second predefined value, "m".

In step 906, the count is compared to a count threshold.

If the count is greater than the count threshold, in step 907, motion is determined to be present and the state of the room is determined to be occupied. It should be noted that this is not the final determination of the occupancy state. The individual determinations are combined to determine occupancy state of the monitored area taking into account timeout logic.

If the count is less than the count threshold, in step 908, motion is not determined to be present and the state of the room is determined to be vacant. It should be noted that this is not the final determination of the occupancy state. The individual determinations are combined to determine occupancy state of the monitored area until the count threshold is met, taking into account timeout logic.

FIG. 10 is flow diagram describing a method for determining the occupancy state of a monitored area, in accordance with an illustrative embodiment of the invention. In step 1001, the combinational logic operator is determined.

In step 1002, if the combinational logic operator is the or operator, it is determined if the occupancy detection algorithm for the PIR sensor 105 and the ultrasonic transducer sensor 102 as described above has determined motion to be present.

In step 1003, if the combinational logic operator is the or operator and either the PIR occupancy detector algorithm or the ultrasonic occupancy detector algorithm has determined motion to be present, the occupancy state of the room is set as occupied. Additionally, certain variables, such as a no motion timer, an occ_et timer and a grace occupancy flag, which are employed by the CPU 104 are cleared.

In step 1004, it is determined if the ultrasonic transducer sensors 102 are disabled. In step 1005, it is determined if the PIR occupancy detector algorithm has determined motion to be present. If the ultrasonic transducer sensors 102 are disabled and the PIR occupancy detector algorithm has determined motion to be present, in step 1003, the occupancy state of the room is set as occupied and the variables are cleared.

In step 1006, it is determined whether the PIR sensor 105 is disabled. In step 1007, it is determined if the ultrasonic occupancy detector algorithm has detected motion to be present. If the PIR sensor 105 is disabled and the PIR occupancy detector algorithm has determined motion to be present, in step 1003, the occupancy state of the room is set as occupied and the variables are cleared.

If the ultrasonic transducer sensors 102 and PIR sensor 105 are not disabled, it is determined if both the ultrasonic occupancy detector algorithm and the PIR occupancy detector algorithm detected motion to be present in step 1008. If both the ultrasonic occupancy detector algorithm and the PIR occupancy detector algorithm detected motion to be present, in step 1003, the occupancy state of the room is set as occupied and the variables are cleared.

The CPU 104 employs an algorithm to enhance performance by reducing false trips. For example, a false trip may be the lights turning off when a room is occupied or lights turning on when a room is vacant. The CPU 104 employs an algorithm that switches between sensitivity thresholds based on the current state of the room being monitored. Typically, the sensor is operated in a less sensitive state when the room is determined to be vacant. Upon detection of motion the sensor switches to a different sensitivity setting. Typically, the sensor is switched to a more sensitive setting to ensure lights do not turn off falsely when occupants are relatively still.

FIG. 11 is a flow diagram describing a method for determining which parameters to employ in an occupancy sensor 10, in accordance with an illustrative embodiment of the invention. In step 1101, a determination is made as to whether the occupancy state of the monitored area is occupied.

In step 1102, if the occupancy state of the monitored area is occupied, the predefined occupancy state parameters are used.

In step 1103, if the occupancy state of the monitored area is not occupied, the predefined vacancy state parameters are used.

Additionally, to reduce false trips the CPU 104 employs an algorithm that disables specific sensor inputs depending on the current state of the room. Typically, the ultrasonic sensors are reduced in sensitivity or disabled completely when the room is deemed vacant to prevent falsely turning lights on when motion occurs outside of the area being monitored. Once motion is detected and the monitored area is deemed occupied, the ultrasonic sensors are re-enabled or sensitivity is increased to ensure the lights do not falsely turn off when occupants are relatively still.

Finally, to reduce false trips, the CPU 104 employs algorithms to qualify occupancy based on one or more sensor inputs determining occupancy to be present. The algorithm can be configured to implement logic requiring both ultrasonic and PIR sensors to sense motion or either one to sense motion before declaring the room occupied.

The CPU 104 employs an algorithm to enhance energy savings. A user can enable a "fast timeout" algorithm wherein the occupancy sensor 10 uses a short timeout. In a typical embodiment of the invention, the timeout is fifteen (15) seconds for the first thirty (30) seconds that a room becomes occupied before switching to the user programmed timeout, typically five (5) to thirty (30) minutes. This algorithm reduces the length of time lights are left on unnecessarily when occupants enter a room and then immediately exit. For example, a user may enter a room to retrieve an item and then immediately exit the room. With the fast-timeout algorithm enabled, entering a room and then leaving within thirty (30) seconds will result in lights turning off fifteen (15) seconds after the room has been vacant as opposed to a much longer time such as thirty (30) minutes.

In typical installations, lighting in a room may be controlled automatically from an occupancy sensor 10 or manually from a keypad or touch panel. An issue often arises when an occupant leaves the room and switches lights off manually at the keypad. For example, if an occupant enters the room after lights have been shut off manually but before the sensor has reached its timeout value (which can typically be as long as thirty minutes), the sensor will not trigger an occupancy event since it still deems the room to be occupied. Only after the occupancy sensor 10 has reached its timeout period and determines the room to be vacant will it then turn the lights back on upon sensing motion. To overcome this problem, the inventive occupancy sensor 10 may receive a signal from the control system instructing it to determine the room as vacant. This allows the occupancy sensor 10 to determine the room is vacant upon the lights being switched off at the keypad. A further timeout is also implemented between receiving message to determine the room as vacant and when the occupancy sensor 10 determines the room to be vacant to avoid triggering the lights to turn on while the occupant is still exiting the room. For example, in an embodiment of the invention, the forced timeout may be set to between five (5) and ten (10) seconds to provide sufficient time for an occupant to exit the detection range of the sensor after switching the lights off at the keypad.

FIGS. 12A and 12B are flow diagrams describing a method for determining the occupancy state of a monitored area, in accordance with an illustrative embodiment of the invention. The flow diagram comprises timers and flags comprising a no motion timer (i.e. occupancy timeout), occupancy elapsed time timer which is used with a short timeout, a grace occupancy timer and a grace occupancy flag. The grace occupancy allows a user to move and turn the lights back on if they exit when a room is still occupied. The flow diagram further comprises inputs comprising an ultrasonic transducer sensor disable for each ultrasonic pair, a PIR sensor disable, a Vac to Occ logic (i.e. combinational logic operator), an occupancy timeout which ranges from 30 seconds to 30 minutes, and a short timeout enable and disable. The short timeout allows for a user to enter an empty room and exit quickly without having the lights stay on for the extended timeout period.

Any process descriptions or blocks in flow charts should be understood as representing modules, segments or portions of code that include one or more executable instructions for implementing specific logic functions or steps in the process. Alternate implementations are included within the scope of the preferred embodiment of the present invention in which functions may be executed out of order from that shown or discussed, including substantial concurrence or reverse order, depending on the functionality involved, as would be understood by those reasonably skilled in the art of the present invention. Also, steps disclosed as separate may be performed concurrently or combined, and a step shown as discrete may be performed as two or more steps. Furthermore, numerical values and disclosures of specific hardware are illustrative rather than limiting. Therefore, the present invention should be construed as limited by only the appended claims.

In this description, various functions and operations may be described as being performed by or caused by software code to simplify description. However, those skilled in the art will recognize what is meant by such expressions is that the functions result from execution of the code by a processor or processing unit, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine of computer-readable media used to actually effect the distribution.

At least some aspects disclosed can be embodied, at least in part, in software. That is, the techniques may be carried out in a computer system or other data processing system in response to its processor/processing unit, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs". Invocation interfaces to these routines can be exposed to a software development community as an API (Application Programming Interface). The computer programs typically comprise one or more instructions set at various times in various memory and storage devices in a computer, and that, when read and executed by one or more processors/processing units in a computer, cause the computer to perform operations necessary to execute elements involving the various aspects.

A machine readable medium can be used to store software and data which when executed by a data processing system causes the system to perform various methods. The executable software and data may be stored in various places, including for example ROM, volatile RAM, non-volatile memory and/or cache. Portions of this software and/or data may be stored in any of these storage devices. Further, the data and instructions can be obtained from centralized servers or peer to peer networks. Different portions of the data and instructions can be obtained from different centralized servers and/or peer-to-peer networks. Different portions of the data and instructions can be obtained from different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include, but are not limited to, recordable and non-recordable type media, such as volatile and non-volatile memory devices, read-only memory (ROM), random access memory (RAM), flash memory devices, floppy and other removable disks, magnetic disk storage media, optical storage media (e.g. Compact Disc Read-Only Memory (CD ROM), Digital Versatile Discs (DVDs), etc.) among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e. stores and/or transmits) information in a form accessible by a machine (e.g. a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination or hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

INDUSTRIAL APPLICABILITY

To solve the aforementioned problems, the present invention is a unique device in which an occupancy sensor 10 employs improved functionality.

LIST OF ACRONYMS USED IN THE DETAILED DESCRIPTION OF THE INVENTION

The following is a list of the acronyms used in the specification in alphabetical order.

ADC analog to digital converter
AV Audio Visual
BAS building automation system
BMS building management system
CPU central processing unit
EMS energy management system
HVAC heating, ventilation and air conditioning
ID identification
IP Internet Protocol
IR infrared
LED light emitting diode
PAN personal area network
PIR passive infrared
PoE power over Ethernet
RAM random access memory
ROM read only memory

Alternate Embodiments

Alternate embodiments may be devised without departing from the spirit or the scope of the invention. For example, the occupancy sensor 10 may comprise a wireless network interface 110 such as a wireless PAN interface.

For example, any of the flow diagrams described herein may be modified or arranged in any manner to support operation in various configurations. The flow diagrams may include more or fewer blocks, combined or separated blocks, alternative flow arrangements, or the like. The flow diagrams may also be implemented in the form of hardware, firmware, or software. If implemented in software, the software may be written in any suitable code in accordance with the example embodiments herein or other embodiments. The software may be stored in any form of computer readable medium and loaded and executed by a general purpose or application specific processor suitable to perform the example embodiments described herein or other embodiments.

What is claimed is:

1. An occupancy sensor for determining an occupancy state of a monitored area, the occupancy sensor comprising:
    a passive infrared sensor configured for generating a signal based on sensed infrared radiation of the monitored area;
    an ultrasonic transducer sensor configured for generating a signal based on sensed ultrasonic echo of the monitored area;
    a memory encoding one or more processor-executable instructions; and
    a processor configured to load the one or more processor-executable instructions when encoded from the memory wherein the one or more processor executable instructions, when executed by the processor, cause acts to be performed comprising:
        receiving at least one signal from the passive infrared sensor and the ultrasonic transducer sensor,
        sampling the at least one signal at an analog to digital converter to produce at least one sampled signal,
        filtering the at least one sampled signal through a digital bandpass filter to produce at least one filtered signal,
        comparing the at least one filtered signal to a first sensitivity threshold,
        maintaining a count of occupancy detections,
        for each filtered signal, increasing the count by a first predefined value if the filtered signal is above the sensitivity threshold and decreasing the count by a second predefined value if the filtered signal is below the sensitivity threshold,
comparing the count to a count threshold, and
determining the monitored area to be occupied if the count is larger than the count threshold.

2. The occupancy sensor of claim 1 wherein:
the at least one signal comprises a first signal received from the passive infrared receiver and a second signal received from the ultrasonic transducer and the first signal corresponds to a first count and the second signal corresponds to a second count; and
the one or more processor executable instructions, when executed by the processor, cause acts to be performed further comprising determining the occupancy state of the monitored area based on a comparison of the first count to the count threshold, a comparison of the second count to the count threshold and a combinational logic operator.

3. The occupancy sensor of claim 2 wherein the one or more processor executable instructions, when executed by the processor, cause acts to be performed comprising:
determining the monitored area to be occupied if the combinational logic operator is an or operator and at least one of the first count and the second count are above the count threshold;
determining the monitored area to be occupied if the combinational logic operator is an and operator and the first count and the second count are above the count threshold.

4. The occupancy sensor of claim 3 further comprising a network interface configured for bidirectional communication on a control network and wherein the combinational logic operator is received from the control network via the network interface.

5. The occupancy sensor of claim 4 wherein the network interface is further configured for receiving at least one of a high frequency cutoff setting and a low frequency cutoff setting.

6. The occupancy sensor of claim 3 further comprising a wireless communication interface configured for bidirectional wireless communication and wherein the combinational logic operator is received from a user via the wireless communication interface.

7. The occupancy sensor of claim 6 further wherein the wireless communication interface is further configured for receiving at least one of a high frequency cutoff setting, a low frequency cutoff setting, the sensitivity threshold, and the count threshold.

8. The occupancy sensor of claim 7 wherein the wireless communication interface is an infrared interface configured for communicating with a wireless remote control.

9. The occupancy sensor of claim 8 further comprising a network interface and wherein:
the infrared interface is further configured for receiving and transmitting RC-5 encoded messages; and
the one or more processor executable instructions, when executed by the processor, cause acts to be performed comprising converting an RC-5 encoded message to a network message and converting a network message to an RC-5 encoded message.

10. The occupancy sensor of claim 1 wherein at least one of the sensitivity threshold and the count threshold are dependent on a time event.

11. The occupancy sensor of claim 1 wherein at least one of the sensitivity threshold and the count threshold are dependent of the occupancy state of the monitored area.

12. The occupancy sensor of claim 11 wherein the at least one of the sensitivity threshold and the count threshold is higher when the monitored area is occupied.

13. The occupancy sensor of claim 1 wherein at least one of the sensitivity threshold and the count threshold are dependent on an occupancy state of a second monitored area.

14. The occupancy sensor of claim 1, wherein the one or more processor executable instructions, when executed by the processor, cause acts to be performed comprising:
determining the monitored area to be occupied if the count is equal to the count threshold.

15. The occupancy sensor of claim 1, wherein the one or more processor executable instructions, when executed by the processor, cause acts to be performed comprising:
setting the count to the count threshold if the count is larger than the count threshold.

16. The occupancy sensor of claim 1, wherein the one or more processor executable instructions, when executed by the processor, cause acts to be performed comprising:
for each filtered signal, increasing the count by the first predefined value if the filtered signal is equal to the sensitivity threshold.

17. The occupancy sensor of claim 1, wherein the first predefined value and the second predefined value are equal.

18. The occupancy sensor of claim 1, wherein the one or more processor executable instructions, when executed by the processor, cause acts to be performed comprising:
determining an absolute value of the at least one filtered signal.

19. The occupancy sensor of claim 1, wherein the one or more processor executable instructions, when executed by the processor, cause acts to be performed comprising:
determining the monitored area to be vacant if the count is less than the count threshold.

20. The occupancy sensor of claim 1, wherein the one or more processor executable instructions, when executed by the processor, cause acts to be performed comprising:
determining if the count is larger than zero;
decrementing the count if the count is larger than zero.

21. The occupancy sensor of claim 1, wherein the one or more processor executable instructions, when executed by the processor, cause acts to be performed comprising:
determining if the decremented count is less than or equal to zero;
determining the monitored area to be vacated if the decremented count is less than or equal to zero.

22. The occupancy sensor of claim 21, wherein the one or more processor executable instructions, when executed by the processor, cause acts to be performed comprising:
setting the decremented count to zero when the decremented count is less than zero.

23. A method for detecting an occupancy state of a monitored area comprising the steps of:
sampling at least one signal from a passive infrared sensor and an ultrasonic transducer sensor at an analog to digital converter to produce at least one sampled signal;
filtering the at least one sampled signal through a digital bandpass filter to produce at least one filtered signal;
comparing the at least one filtered signal to a sensitivity threshold;
maintaining a count of occupancy detections;
for each of the at least one filtered signals, increasing the count by a first predefined value if the filtered signal is larger than the sensitivity threshold and decreasing the count by a second predefined value if the filtered signal is not larger than the sensitivity threshold; and comparing the count to a count threshold; and determining the monitored area to be occupied if the count is larger than the count threshold.

24. The method of claim 23 further comprising the step of determining at least one of the sensitivity threshold and the count threshold according to a time of day, a day of week.

25. The method of claim 23 further comprising the step of determining at least one of the sensitivity threshold and the count threshold according to a day of week.

26. The method of claim 23 further comprising the step of determining at least one of the sensitivity threshold and the count threshold according to the occupancy state of the monitored area.

27. The method of claim 23 further comprising the step of determining at least one of the sensitivity threshold and the count threshold according to the occupancy state of a second monitored area.

28. The method of claim 23 further comprising the step of receiving at least one of the sensitivity threshold and the count threshold from a control network.

29. The method of claim 23 further comprising the step of receiving at least one of a high bandwidth cutoff setting and a low bandwidth cutoff setting from a control network.

30. The method of claim 23 further comprising the step of receiving at least one of the sensitivity threshold and the count threshold from a user remote control device.

31. The method of claim 23 further comprising the step of receiving at least one of a high bandwidth cutoff setting and a low bandwidth cutoff setting from a user remote control device.

32. The method of claim 23 further comprising the steps of:

receiving an RC-5 encoded message via a wireless communication interface;

converting the RC-5 encoded message to a network message; and transmitting the network message to a control network via a network interface.

33. A method for detecting an occupancy state of a monitored area comprising the steps of:

sampling a first signal from a passive infrared sensor and a second signal from an ultrasonic transducer sensor at an analog to digital converter to produce a first sampled signal and a second sampled signal;

filtering the first sampled signal and the second sampled signal through a digital bandpass filter to produce a first filtered signal and a second filtered signal;

comparing the first filtered signal and the second filtered signal to a sensitivity threshold;

maintaining a first count of occupancy detections by the passive infrared sensor and a second count of occupancy detections by the ultrasonic transducer sensor;

increasing the first count by a first predefined value if the filtered first signal is above the sensitivity threshold and decreasing the first count by a second predefined value if the filtered first signal is below the sensitivity threshold;

increasing the second count by a first predefined value if the filtered second signal is above the sensitivity threshold and decreasing the second count by a second predefined value if the filtered second signal is below the sensitivity threshold;

comparing the first count and the second count to a count threshold;

determining the monitored area to be occupied if at least one of the first count and the second count are larger than the count threshold and the combinational logic operator is an or operator; and determining the monitored area to be occupied if both the first count and the second count are larger than the count threshold.

34. The method of claim 33 further comprising the step of determining the combinational logic operator according to the occupancy state of the monitored area.

35. The method of claim 33 further comprising the step of receiving the combinational logic operator according to the occupancy state of a second monitored area.

* * * * *